(12) United States Patent
Merth et al.

(10) Patent No.: US 9,065,094 B2
(45) Date of Patent: Jun. 23, 2015

(54) FUEL CELL SYSTEM HAVING A FUEL CELL ARRANGED IN A HOUSING

(75) Inventors: Rainer Merth, Ulm (DE); Stefan Pfitzer, Wernau (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/703,541

(22) PCT Filed: Apr. 16, 2011

(86) PCT No.: PCT/EP2011/001942
§ 371 (c)(1),
(2), (4) Date: Dec. 11, 2012

(87) PCT Pub. No.: WO2011/154070
PCT Pub. Date: Dec. 15, 2011

(65) Prior Publication Data
US 2013/0089800 A1    Apr. 11, 2013

(30) Foreign Application Priority Data

Jun. 12, 2010   (DE) .................. 10 2010 023 671

(51) Int. Cl.
*H01M 8/04*   (2006.01)
*H01M 8/24*   (2006.01)

(52) U.S. Cl.
CPC ...... *H01M 8/04111* (2013.01); *H01M 8/04425* (2013.01); *H01M 8/04082* (2013.01); *H01M 8/04395* (2013.01); *H01M 8/04231* (2013.01); *H01M 8/2475* (2013.01); *Y02E 60/50* (2013.01); *H01M 8/04664* (2013.01)

(58) Field of Classification Search
CPC ............. H01M 8/04007; H01M 8/04067; H01M 8/04111; H01M 8/04201; H01M 8/04395; H01M 8/04425; H01M 8/04082
USPC ......................................... 429/444
See application file for complete search history.

(56) References Cited

U.S. PATENT DOCUMENTS

| 2004/0151958 A1 | 8/2004 | Formanski et al. |
| 2008/0220295 A1* | 9/2008 | Harris ............... 429/17 |
| 2010/0035100 A1 | 2/2010 | Hornburg et al. |
| 2011/0027678 A1 | 2/2011 | Nuessle |

(Continued)

FOREIGN PATENT DOCUMENTS

| CN | 1745494 A | 3/2006 |
| DE | 10 2006 031 866 A1 | 1/2008 |
| DE | 10 2007 042 784 A1 | 3/2009 |

(Continued)

OTHER PUBLICATIONS

International Search Report with English translation dated Sep. 6, 2011 (six (6) pages).

(Continued)

*Primary Examiner* — Jane Rhee
(74) *Attorney, Agent, or Firm* — Crowell & Moring LLP

(57) ABSTRACT

A fuel cell system includes at least one fuel cell arranged in a housing and an conveyor means for air supply for a cathode region of this fuel cell. A partial air flow branches off from the supply air to the fuel cell after the conveyor, the partial air flow flowing as bearing air and/or cooling air at least through a part of the conveyor. The partial air flow flows in the flow direction before or after the conveyor as scavenging air through the housing of the fuel cell.

19 Claims, 1 Drawing Sheet

(56) References Cited

U.S. PATENT DOCUMENTS

Figure 1:
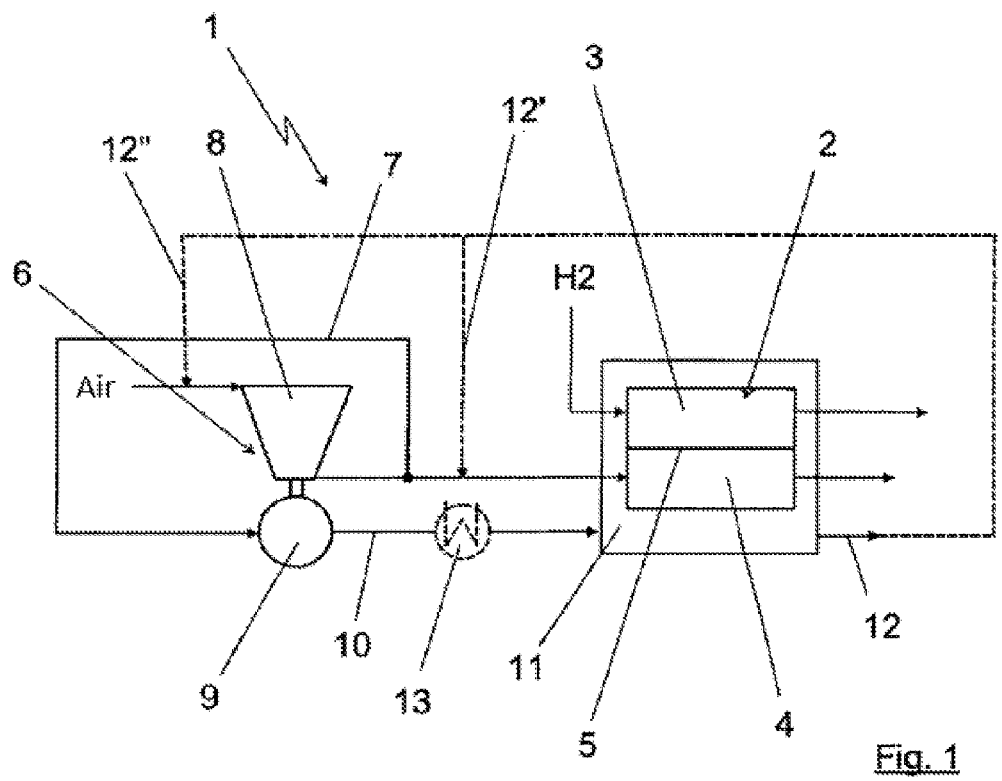

| | | |
|---|---|---|
| 2011/0045369 A1 | 2/2011 | Nuessle |
| 2011/0117464 A1 | 5/2011 | Boltze et al. |

FOREIGN PATENT DOCUMENTS

| | | |
|---|---|---|
| DE | 10 2008 016 578 A1 | 10/2009 |
| DE | 10 2008 016 579 A1 | 10/2009 |
| JP | 2-312162 A | 12/1990 |
| JP | 9-35734 A | 2/1997 |
| JP | 2002-246058 A | 8/2002 |
| JP | 2005-135835 A | 5/2005 |
| JP | 2007-299691 A | 11/2007 |
| JP | 2008-215175 A | 9/2008 |
| JP | 2010-62142 A | 3/2010 |
| WO | WO 02/01663 A1 | 1/2002 |
| WO | WO 2008/052577 A1 | 5/2008 |

OTHER PUBLICATIONS

German Language Written Opinion (PCT/ISA/237) (seven (7) pages).

Japanese Office Action dated Feb. 12, 2014, with English Translation (Six (6) pages).

English Translation of Chinese Office Action dated Aug. 27, 2014 (five (5) pages).

\* cited by examiner

FUEL CELL SYSTEM HAVING A FUEL CELL ARRANGED IN A HOUSING

BACKGROUND AND SUMMARY OF THE INVENTION

Exemplary embodiments of the present invention relate to a fuel cell system having at least one fuel cell arranged in a housing.

Fuel cell systems having at least one fuel cell are known from the general prior art. The fuel cell is frequently designed as a stack of individual fuel cells, and the fuel cell stack can be used to generate electric drive energy in a vehicle. The fuel cells can be designed as PEM fuel cells.

Such fuel cells or also other types of fuel cells are generally supplied with hydrogen or a hydrogen-containing gas as a fuel for an anode side of the fuel cell and with oxygen or with the oxygen contained in the air on the cathode side of the fuel cell. Various measures are known from the prior art for reacting to potential leaks of such a fuel cell stack and to thereby prevent formation of combustible mixtures of hydrogen or hydrogen-containing gas and air. In this connection the fuel cell stack is typically arranged in a housing. Scavenging air can flow through the housing, as described in, for example, German Patent Document DE 10 2007 042 784 A1. This scavenging air can thereby flush out any slight leakages of hydrogen and/or oxygen from the housing and feed these to an area of the fuel cell system in which either adequate dilution takes place so that an explodable mixture no longer exists, or in which the hydrogen is combusted or catalytically combusted in order to thus avoid hydrogen emissions and ignitable mixtures.

This structure, as described for example in the above-mentioned German Patent Document DE 10 2007 042 784 A1, thereby requires comparatively high resources as various components are needed to maintain a scavenging air flow.

It is also generally known to use flow compressors to the convey air required for the cathode region. Such conveying means for the supply air can, for example, be pure flow compressors that are driven by an electric motor. Structures are also known and usual, however, in which single-stage or multi-stage conveying means are formed, of which at least one stage is formed in the manner of a turbocharger. Furthermore, so-called electric turbochargers are known and usual. These use, in a turbine arranged on a common shaft with a flow compressor, residual energy from the region of the fuel cell system or optionally thermally generated energy, for example from a (catalytic) burner in order to thereby drive the flow compressor. At the same time an electric machine is provided on the shaft, which works—according to the power needed and supply—either as an electric motor in order to support the flow compressor or as a generator if there is more power on the turbine than is required for the flow compressor. Any contamination of this supply air flow, for example with lubricating oil or similar, could lead to lasting damage to the fuel cell and must therefore be avoided. In order to ensure that in such structures no lubricating oil contamination or similar is caused for the cathode region of the fuel cell, it is common to use air bearing systems in order to thus be able to achieve a very pure supply air flow to the cathode region of the fuel cell.

Exemplary embodiments of the present invention to involve a fuel cell system that avoids the abovementioned disadvantages and guarantees a highly functional structure with a simple, compact and cost-effective fuel cell system.

In accordance with exemplary embodiments of the present invention the partial air flow, which flows through at least a part of the conveying means as bearing air and/or cooling air, flows in the flow direction before or after the conveying means as scavenging air through the housing of the at least one fuel cell. In the structure according to the invention the bearing air and/or cooling air that is branched off from the supply air to the fuel cell after the conveying means is used for the conveying means in order to flow through, besides at least one part of the conveying means as scavenging air, also the housing of the at least one fuel cell. Any leakages and/or ignitable or explosive mixtures of any gases leaving the fuel cell are thereby taken up in the known way and can be discharged to the environment diluted by the scavenging air or are supplied for other uses and/or post-combustion to suitable components. Thus, the present invention maintains full functionality without requiring an additional fan or similar for the scavenging air of the housing. This avoids the need for a conveying means and the associated costs as well as the construction space required by this conveying means. The fuel cell system according to the invention can therefore be designed to be more compact, lighter and more cost-effective than the fuel cell systems according to the prior art.

According to a further particularly favorable embodiment of the fuel cell system according to the invention the scavenging air flows through the housing in the flow direction after the conveying means. This flow direction ensures a comparatively high pressure in the region of the conveying means so that the bearing air and/or cooling air arrives here securely and reliably with the required pressure and the required volume flow. After flowing through the conveying means and the pressure losses unavoidably arising, the scavenging air then arrives in the region of the housing. Since no high pressure losses typically arise and no through-flow with a particularly high volume flow is required, the remaining flow energy of the scavenging air after flowing through the conveying means is completely adequate so that no energy or only minimal energy must be expended by the conveying means in order to realize the additional flushing of the housing with the scavenging air. The structure thus saves construction space and components without energy expenditure or with only minimal energy expenditure in comparison with the conventional structure. In relation to a structure with its own conveying means for the scavenging air, not only construction space and construction volume are thereby saved but also energy.

According to a very advantageous development of the system according to the invention the scavenging air can also flow through at least one heat exchanger between the conveying means and the housing. The temperature in the region of the scavenging air before entering the housing can thereby be correspondingly reduced in order to avoid risk of heating the housing and the at least one fuel cell located therein through the scavenging air. This is particularly advantageous if the scavenging air had also assumed cooling tasks in the region of the conveying means, for example cooling of an electric motor drive for the conveying means. A gaseous or liquid cooling medium can thereby flow through the heat exchanger in order to thus cool the scavenging air. The gaseous cooling medium could, for example, be the cooling medium present in a cooling circuit of the fuel cell system.

According to an alternative or supplementary embodiment of the invention a line element is also provided for the scavenging air between the conveying means and the housing, which is formed to be longer than would be necessary for the pure flow connection. By means of a line element designed to be longer and which preferably extends in cooler regions of the fuel cell system, it is possible alternatively or additionally to the above-mentioned heat exchanger for a cooling of the scavenging air to be achieved before entry into the housing through the longer flow path.

According to a favorable development of the fuel cell system according to the invention the scavenging air flows, after flowing through the housing, into a region which comprises catalytically active material.

The feeding of the scavenging air into a region with catalytically active material is very suitable for removing any hydrogen emissions produced through leakages of the at least one fuel cell within the housing. Emissions to the environment are thereby avoided and it is possible to securely and reliably avoid an ignitable mixture that constitutes a potential risk. The region with the catalytically active material can thereby have a different configuration. It is conceivable, for example, as known from the prior art, to use a recombinator that merely serves to use up any hydrogen contained in the scavenging air or to convert it with air oxygen to water. Alternatively or additionally, it is possible to feed the scavenging air, after through-flow of the housing, for example, by the supply air, to the cathode region. Since the electro-catalyst of the at least one fuel cell is present as a catalytically active material in the cathode region, it is possible to react the minimal quantities of hydrogen transported here with the scavenging air without negatively influencing the performance of the fuel cell. As this catalyst must be present anyway in order to maintain the electrochemical functionality of the fuel cell, it is possible with this structure to omit a catalyst provided specifically for reacting the scavenging air. There is thus a clear cost advantage when using, for example, platinum as a catalyst due to the comparatively high costs associated with the catalyst. In addition there is an advantage in relation to the construction space and the weight. Alternatively, however, a catalytic burner can be used which is designed, for example, so that exhaust gases from the anode region and the cathode region combust therein and the hot exhaust gases drive an expander that is combined, for example, with the conveying means, as already described above. In such a structure the scavenging air can then also be supplied to this catalytic burner. In this way it is possible to ensure, without requiring an additional catalytically active material, that no hydrogen emissions reach the environment with the scavenging air.

According to an advantageous embodiment of the fuel cell system according to the invention the scavenging air can flow in the flow direction before and/or after the housing and/or the conveying means through further components to be cooled and/or heated. The scavenging air will correspondingly heat up upon flowing through the conveying means as bearing air or cooling air and should normally arrive without too high a temperature in the region of the housing. It can therefore be used previously, for example, to heat components to be heated. The cooling air branched off anyway as a partial flow or supply air can be used, alternatively or additionally hereto, also for cooling further components.

In particular, in the case of a cold start of the fuel cell system, the scavenging air, which typically heats as bearing air and/or cooling air of the conveying means, can be used without intermediately arranged or active heat exchanger or other components to be heated, to heat the fuel cell stack within its housing. This allows the cold start time for the fuel cell system to be correspondingly shortened without having to provide additional energy for this. After a successful cold start it is then possible, for example through an activation through flow-through of the abovementioned optional heat exchanger with a cooling medium, for example a gaseous or a liquid cooling medium, for a cooling of the scavenging air to take place before entry into the housing in order to thus ensure that no unnecessary heat enters the region of the fuel cell stack during normal operation.

According to an advantageous further development of the fuel cell system according to the invention the conveying means can also comprise an electric machine and an expander. This embodiment of the conveying means is also described as an electric turbocharger and is known in itself from the prior art. The expander thereby uses energy present in the exhaust gases of the fuel cell in order to thus reduce the drive power for the conveying means brought via the electric machine as a motor. In case of a high power on the expander and low consumption of the conveying means the electric machine can also be operated as a generator in order to convert the energy recovered through the expander into electrical energy.

According to a further very favorable embodiment the expander can expand exhaust gas or at least a fuel cell, wherein the exhaust gases flow through a burner in the flow direction before the expander. In such a burner, which can be formed, for example, as a pore burner or in a preferred development as a catalytic burner, the exhaust gases of the fuel cell can be burnt. These contain, in any case, residual oxygen in the exhaust air from the cathode. Furthermore, depending upon the structure and type of the fuel cell, at least a residual amount of hydrogen is contained in the exhaust gases, for example if the anode exhaust gas is fed in the circuit around the anode. From time-to-time a release of the gas in the circuit is necessary in order to avoid—through the enrichment of inert gases—the hydrogen concentration in the anode region falling below a certain value. In this case hydrogen is contained in the released gas that can be combusted together with the residual oxygen in the air. According to an alternative structure of the anode region without a circuit, hydrogen is typically supplied in a certain excess quantity in the anode region in order to achieve an even flow to the available active surface. In this case the anode exhaust gas then continuously contains a certain residual quantity of hydrogen that can be combusted with the residual oxygen in the cathode exhaust air. As already mentioned above, the scavenging air can also be fed after the housing for this combustion. Any hydrogen contained therein is thus also combusted. As a result of the combustion, hot exhaust gases are produced that output more energy upon expansion in the expander than if the overpressure in the exhaust gases is used to recover energy.

According to a further very favorable embodiment an optional fuel can also be fed to the burner. This structure allows, by means of optional fuel, for example hydrogen or an initial substance for the production of hydrogen, which is carried along in the fuel cell system, to optionally heat the burner. In this way a comparatively high thermal energy can be provided in the region of the expander. The power thus obtained via the expander can then be converted in the electric machine into electrical power that can be used, for example, to cover short-term power peaks, as may arise in particular during acceleration of a vehicle equipped with such a fuel cell system. By means of the expander and the burner a boost function can thus be realized through the optional fuel.

BRIEF DESCRIPTION OF THE DRAWING FIGURES

Figure 2:
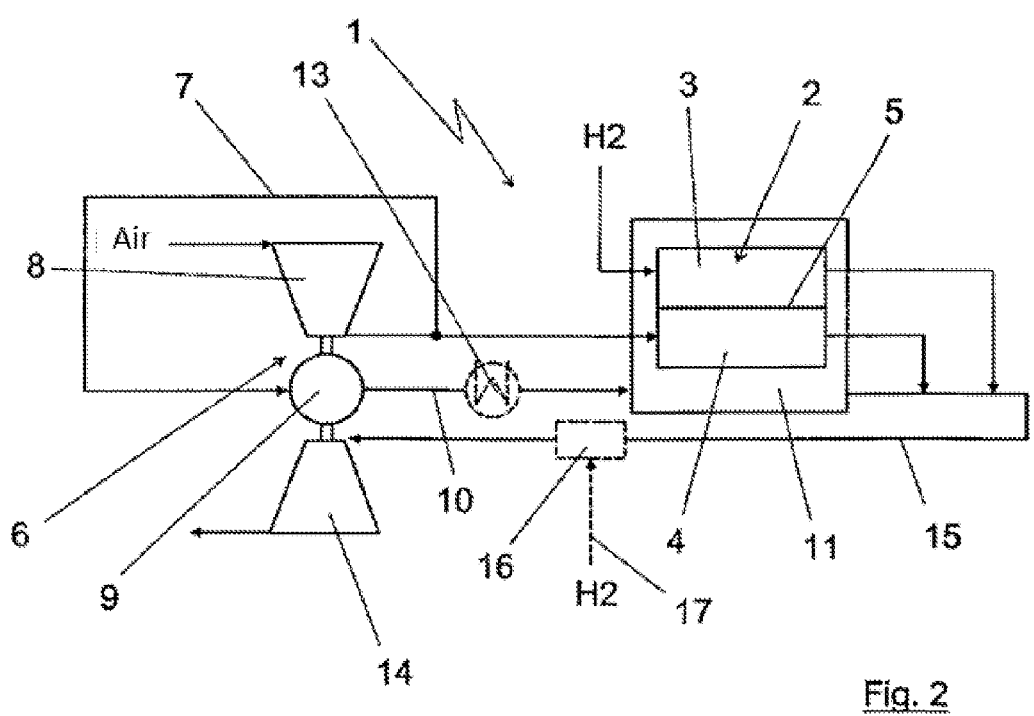

Further advantageous embodiments follow and will become clear by reference to the exemplary embodiment which is described in greater detail below with the aid of the drawings, in which:

FIG. 1 shows a fuel cell system in a first exemplary embodiment according to the invention; and FIG. 2 shows an alternative embodiment of the fuel cell system.

DETAILED DESCRIPTION

The structure shown in FIG. 1 shows the cut-out of a fuel cell system 1 relevant for the present invention. This comprises a fuel cell 2 that is constructed here, for example, as a stack of individual PEM fuel cells. The fuel cell 2 is thus divided into an anode region 3 and a cathode region 4 that are separated from each other by the membrane 5. Hydrogen H2 is thereby fed to the anode region 3 in the known way, for example from a compressed gas storage element, which is not shown in greater detail. The hydrogen H2 flows through the anode region 3 and then arrives, for example, via an anode loop (not shown here) back at the inlet region of the anode region 3. Alternatively, it can flow out of the anode region 3 and be used elsewhere. In principle it is also conceivable to arrange the structure of the anode region 3 in such a way that this completely converts the hydrogen flowing therein. As this is not of further significance for the present invention, merely a flow-through of the anode region 3 with hydrogen is shown in both figures, whereby an anode circuit or similar are not represented. However, the invention can of course also be correspondingly combined with such structures or these structures are clear to the person skilled in the art.

Air is fed to the cathode region 4 of the fuel cell 2 via a conveying means 6. The air supplied can thereby flow— before the conveying means 6—for example through an air filter and—after the conveying means 6—also through a charge air cooler and/or a moistener. This also has no further relevance for the invention and has not therefore been shown in the figures. It is, however, clear to the person skilled in the art that these structures can also be similarly present in any combination.

A partial air flow is taken from the supply air to the cathode region 4 in the flow direction after a compressor of the conveying means 6. This partial air flow flows through the line designated in the figures with reference numeral 7 into the region of the conveying means 6. The line 7 can thereby be designed in principle in any way. In particular it can be formed as an internal line 7 in the housing of the conveying means 6 and thus feed the partial air flow directly within the conveying means 6.

This structure—as shown in FIG. 1—is thereby to be understood purely by way of example. The partial air flow branched off via the line 7 is to serve in the region of the conveying means 6 in particular as bearing air for flowing through air bearings of the compressor 8 of the conveying means 6. In addition the partial air flow can be used as cooling air, for example, for an electromotor drive 9 of the conveying means 6. The partial air flow then flows, after flowing through the conveying means 6 or a part of the conveying means 6, via a line element with the reference numeral 10 into a housing 11 that surrounds the fuel cell 2. This housing 11 thereby has the task of mechanically protecting the fuel cell 2 on the one hand and on the other hand securely sealing the structure of the fuel cell 2 so that any emissions leaving the fuel cell 2 do not reach the environment. The partial air flow flowing, after flow-through of at least a part of the conveying means 6, via the line element 10 into the region of the housing 11, serves here as scavenging air in order to flush through the housing 11 and thus expel any hydrogen emissions or also other emissions from the housing 11. This expulsion of emissions can thereby take place either directly to the environment, as indicated by the dotted line section with the reference numeral 12. Alternatively or additionally, the scavenging air can, after flowing through the housing 11, also be recirculated via the line section with the reference numeral 12' and 12" into the region of the supply air flowing to the cathode region 4 either before or after the conveying means 6. Together with the supply air flowing to the cathode region 4 the scavenging air can then assume the oxygen supply of the fuel cell 2. Any hydrogen leaving, which is carried along by the scavenging air, can thereby react in the region of the electro-catalysts that are already present in the cathode region 4 so that no harmful emissions reach the environment and in particular no ignitable or even explosive mixtures are produced in the environment of the fuel cell system.

The line sections 12' and 12" could thereby be combined with a discharge line of an anode circuit, as also in this case the discharged gases are frequently conveyed into the cathode region 4 so that hydrogen contained in the gases discharged from such an anode circuit reacts in the region of the electro-catalysts of the cathode region 4.

An optional heat exchanger 13 can additionally be seen in the illustration of FIG. 1. This optional heat exchanger 13 can be designed, for example, as an air/air heat exchanger or have a liquid cooling medium, for example the cooling medium in the cooling circuit of the fuel cell 2, flowing through it. Here it cools the scavenging air in the region of the line element 10 in order to thus remove heat that has entered the scavenging air in the region of the conveying means 6 so that no additional/unnecessary heating of the fuel cell 2 takes place through the scavenging air.

With the incorporation of the optional heat exchanger 13 into the cooling circuit of the fuel cell 2, it can further be provided that this is designed so that cooling medium only flows through it when needed. In case of a cold start of such a fuel cell system 1 the scavenging air, which heated after the at least partial through-flow of the conveying means 6, can be used to heat the fuel cell 2 in the housing 11. It is possible, without an additional energy requirement, for a more rapid heating of the fuel cell 2 and thus a more rapid cold start of the fuel cell system 1 to be realized.

Alternatively or additionally, the scavenging air can also be used for example in the region of the line element 10 to flow through other components to be heated and/or cooled. In particular, the sequence of the components to be heated and/or cooled should be selected in such a way that a scavenging air with admissible temperature reaches the inlet into the housing 11 during regular operation.

FIG. 2 illustrates an alternative embodiment of the fuel cell system 1. Components provided with the same reference numerals can also be understood in the same way as the previously described components. The structure provides that the exhaust gases from the cathode region 4 and the anode region 3 are mixed with each other and expanded in the region of an expander 14. The conveying means 6 is thus constructed in this exemplary embodiment shown in FIG. 2 as an Electric Turbo Charger (ETC). This structure can thereby use the compression energy in the exhaust gases in the region of the expander 14 in order to recover at least part of the energy expended in the region of the compressor 8. Otherwise, the structure is comparable with the above-described structure having regard to the scavenging air. The scavenging air passes, after flowing through the housing 11, via a line section with the reference numeral 15, together with the exhaust gas from the anode region 3 and the cathode region 4 to the expander 14. It is also possible here for the exhaust gas from the anode region 3 to be understood as either the exhaust gas from an anode region with continuous flow-through or the exhaust gas discharged from time to time from an anode circuit.

In the illustration of FIG. 2, an optional burner 16 is also shown. This optional burner 16, arranged in the flow direction of the mixed exhaust gases before the expander 14, can be formed for example as a pore burner or in particular also as a catalytic burner. It is used to thermally convert the combustible residual substances, for example residual oxygen and hydrogen, contained in the scavenging air and thus to provide a higher temperature level of the exhaust gases before entry into the expander 14. By means of this higher temperature level, not only the pressure differences in the region of the expander can be recovered but also energy chemically bound with the exhaust gas can be converted at least partially via the expander 14. Optional fuel can also be supplied to the burner 16 in certain operating states. This is indicated in the illustration of FIG. 2 by means of the arrow 17. The hydrogen H2 is thereby fed, for example, to the burner 16 that is also used to operate the fuel cell 2.

In the fuel cell system 1 or in a system electrically supplied by the fuel cell system 1, in particular an electric drive train of a vehicle, dynamic power requirements can arise. From time-to-time, for example during acceleration of the vehicle, corresponding power peaks are to be covered. As the fuel cell 2 itself does not have such high dynamics, it is difficult to promptly cover these power peaks via the fuel cell 2 itself. It is possible, however, in the meantime to provide a comparatively high thermal energy in the exhaust gases through the supply of optional hydrogen H2 to the burner 16. At least in the short term, a very large amount of power can be obtained via the expander 14, which is then converted via the electric machine 9, which is then used as a generator, into electrical energy. Therefore, by means of the power provided on the expander 14 not only the compressor 8 is driven but electrical power is also produced at the same time via the electric machine 9 operated as a generator. This allows an electric boost effect to be achieved and a large and rapid increase in electric power can be satisfied very dynamically.

The structures shown in FIGS. 1 and 2 thereby use already existing media flows that are required as bearing air or cooling air in the region of the conveying means 6 or the conveying means 6 formed as an ETC in order to use these elsewhere and to use them as scavenging air for the housing 11 of the fuel cell 2. Components, construction space and weight are thereby saved. Finally, this supports the structure of the fuel cell system 1 as a cost-effective and energy-efficient system.

Various aspects of the exemplary embodiments shown in FIGS. 1 and 2 can thereby obviously be combined with each other so that also in the embodiment according to FIG. 1 an expander 14 and an optional burner 16 could be used. Likewise, a part of the exhaust gas can also be carried—in the embodiment within the scope of FIG. 2—either into the region of the supply air cathode, before or after the conveying means 6, or to the environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system comprising:
   at least one fuel cell arranged in a housing; and
   a conveyor configured to supply air for a cathode region of the fuel cell,
   wherein the fuel cell system is configured so that a partial air flow is branched off from the supply air to the at least one fuel cell after the conveyor, the partial air flow flowing through at least air bearings of the conveyor as bearing air or through a motor of the conveyor as cooling air, and
   wherein the fuel cell system is configured so that the partial air flow flows in a flow direction before or after the conveyor as scavenging air through the housing of the at least one fuel cell.

2. The fuel cell system according to claim 1, wherein the fuel cell system is configured so that the scavenging air flows through the housing in the flow direction after the conveyor.

3. The fuel cell system according to claim 2, wherein the fuel cell system is configured so that the scavenging air flows through a heat exchanger between the conveyor and the housing.

4. The fuel cell system according to claim 2, further comprising:
   a line element for the scavenging air, wherein the line element is longer between the conveyor and the housing than is necessary for pure flow connection.

5. The fuel cell system according to claim 1, wherein the fuel cell system is configured so that the scavenging air flows, after through-flow of the housing, into a region that comprises catalytically active material.

6. The fuel cell system according to claim 1, wherein the fuel cell system is configured so that the scavenging air flows in the flow direction before or after the housing or the conveyor through further components to be cooled or heated.

7. The fuel cell system according to claim 1, wherein the conveyor comprises an electric machine and an expander.

8. The fuel cell system according to claim 7, wherein the expander is configured to expand exhaust gas of the at least one fuel cell, wherein the exhaust gases flow in the flow direction before the expander through a burner.

9. The fuel cell system according to claim 8, wherein the burner is a catalytic burner.

10. The fuel cell system according to claim 8, wherein the fuel cell system is configured so that additional fuel is fed to the burner.

11. A fuel cell system comprising:
    at least one fuel cell having a cathode region and arranged in a housing;
    a conveyor having an inlet to receive air and an outlet to supply air,
    wherein the conveyor is coupled to the cathode region of the fuel cell via a branch point that supplies a first part of the supply air from the conveyor outlet to the cathode region of the fuel cell and supplies a second part of the supply air from the conveyor outlet back into the conveyor and through air bearings of the conveyor as bearing air or through a motor of the conveyor as cooling air, and
    wherein the second part of the supply air, after passing through the conveyor as bearing air or cooling air, is supplied as scavenging air through the housing of the at least one fuel cell.

12. The fuel cell system according to claim 11, further comprising:
    a heat exchanger arranged between the conveyor and the housing so that the second part of the supply air passes through the heat exchanger after passing through the conveyor as bearing air or cooling air and then into the housing as the scavenging air.

13. The fuel cell system according to claim 11, further comprising:

a line element for the scavenging air, wherein the line element carries the second part of the supply air after passing through the conveyor as bearing air or cooling air, and wherein the line element is longer between the conveyor and the housing than is necessary for pure flow connection.

14. The fuel cell system according to claim 11, wherein the fuel cell system is configured so that the scavenging air flows, after through-flow of the housing, into a region that comprises catalytically active material.

15. The fuel cell system according to claim 11, wherein the fuel cell system is configured so that the scavenging air flows in the flow direction before or after the housing or the conveyor through further components to be cooled or heated.

16. The fuel cell system according to claim 11, wherein the conveyor comprises an electric machine and an expander.

17. The fuel cell system according to claim 16, wherein the expander is configured to expand exhaust gas of the at least one fuel cell, wherein the exhaust gases flow in the flow direction before the expander through a burner.

18. The fuel cell system according to claim 17, wherein the burner is a catalytic burner.

19. The fuel cell system according to claim 17, wherein the fuel cell system is configured so that additional fuel is fed to the burner.

* * * * *